Dec. 8, 1970  G. M. CRAIG  3,546,021
GALVANIC CELL AND METHOD OF OPERATION
Original Filed June 16, 1966  2 Sheets-Sheet 1

INVENTOR.
Gale M. Craig
BY
R. J. Wallace
ATTORNEY

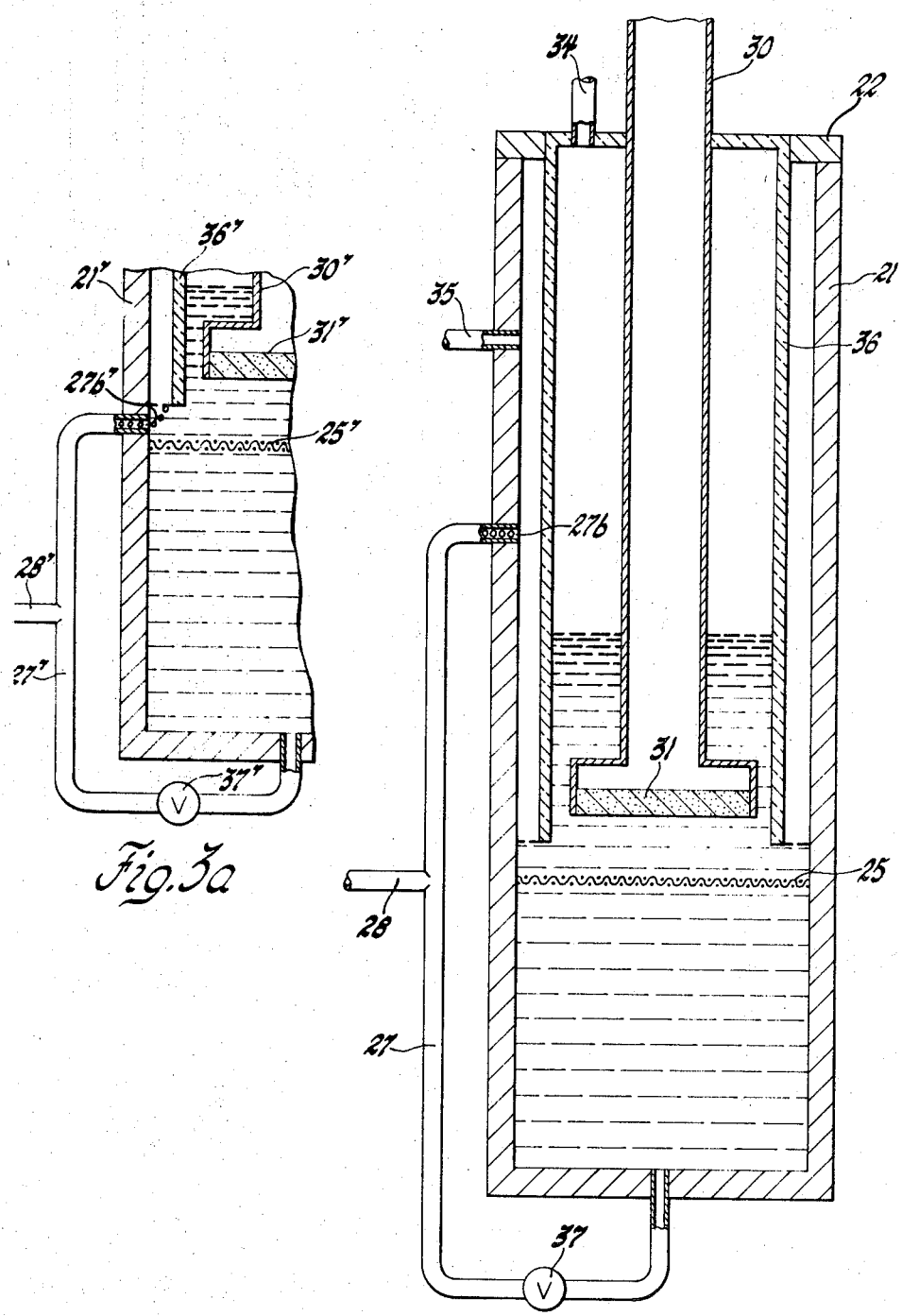

United States Patent Office 3,546,021
Patented Dec. 8, 1970

3,546,021
GALVANIC CELL AND METHOD OF OPERATION
Gale M. Craig, Anderson, Ind., assignor to General Motors Corporation, Detroit, Mich., a corporation of Delaware
Continuation of application Ser. No. 557,954, June 16, 1966. This application Apr. 2, 1969, Ser. No. 812,927
Int. Cl. H01m 27/20
U.S. Cl. 136—86                         12 Claims

ABSTRACT OF THE DISCLOSURE

A reversible electrode assembly for a liquid reactant of a regenerative fuel cell in which the assembly contains a reservoir for receiving and dispensing the liquid reactant, means for buoying the reactant up on cell discharge and means for effecting a differential pressure in the direction of the reservoir during cell recharge.

---

This is a continuation of U.S. patent application Ser. No. 557,954, filed June 16, 1966, assigned to the assignee of this invention and now abandoned.

This invention relates generally to regenerative fuel cells and more specifically to reversible electrodes for use therewith.

The expression "regenerative fuel cell" as used herein is intended to encompass those fuel cells in which at least one of the reactants is recovered from the electrolyte and reused by the cell. Regenerative-type fuel cells wherein one or both of the reactants are externally recovered from the electrolyte and cycled back to the cell for reconsumption are known. Such external regeneration as thermal, electrolytic and chemical have been employed. Such methods require additional peripheral equipment. In addition to being costly, this peripheral equipment adds to the overall weight of the system, thereby reducing the effective power to weight ratio. This power to weight ratio is ofttimes a critical design factor in such areas as missiles, extraterrestrial excursion equipment, mobile power packs, etc. Fuel cells having high power to weight ratios have been sought for some time. Completely reversible electrodes and in-cell storage of recovered reactants eliminates the need for the aforesaid peripheral equipment thereby increasing the power to weight ratio.

An object of my invention is to eliminate the need for excessive, costly, heavy fuel cell system peripheral equipment.

Another object of my invention is to provide a completely reversible fuel cell electrode.

Another object of my invention is to provide a completely reversible electrode primarily for use in a fuel cell, which fuel cell's reactants and electrolyte are such that the ratio of the specific gravity of the electrolyte to that of the reactant is greaer than unity.

Another object of my invention is to provide a completely reversible fuel metal electrode for use primarily in a liquid metal/molten salt fuel cell wherein the ratio of the specific gravity of the molten salt to that of the liquid metal is greater than unity.

Another object of my invention is to provide a completely reversible lithium fuel electrode for use in a molten lithium/lithium chloride/chlorine fuel cell.

Another object of my invention is to provide an electrode capable of regenerating and storing its associated reactant in situ by applying current to and controlling the differential pressure across the active element of the electrode.

Still another object of my invention is to provide a process for the discharge of a fuel cell through a completely reversible electrode capable of storing one of the reactants in situ.

Another object of my invention is to provide a process for the charging of a fuel cell through a completely reversible electrode capable of storing one of the reactants in situ by applying current to and controlling the differential pressure across the active element of the electrode.

Another object of my invention is to provide an electrode capable of regenerating and storing its associated reactant in situ by applying current to and controlling the differential pressure across the active element of the electrode during recharging by means of an air-lift type pump.

These and other objects of my invention will be obvious from the following detailed discussion of some particular embodiments of this invention.

FIG. 3 is a cross sectional view of another embodiment of the device encompassed within the scope of my invention.

FIG. 3a is a modified version of the device of FIG. 3.

Figure 1:
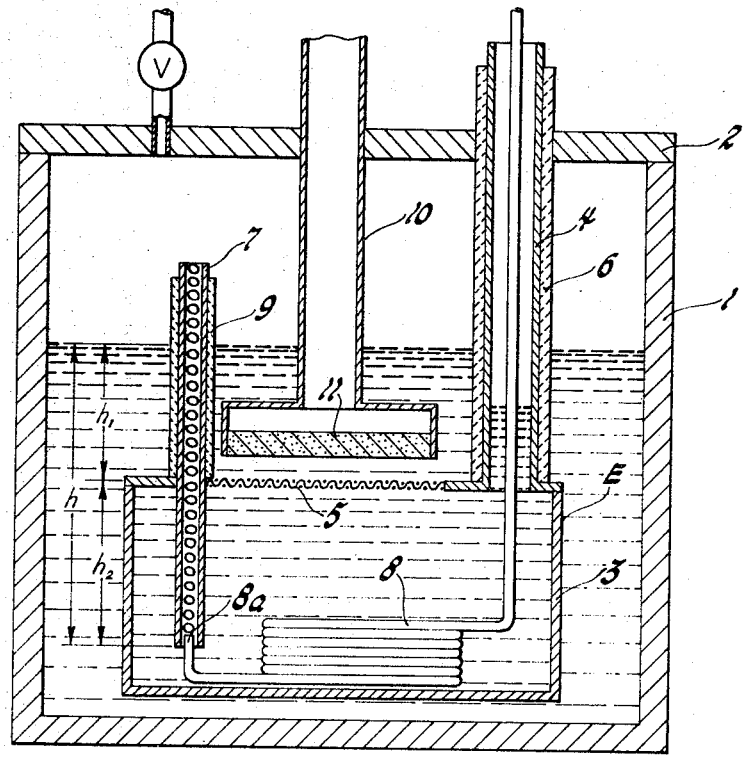
FIG. 1 is a cross sectional view of but one device encompassed within the scope of my invention.

Briefly stated, my invention is an electrode for use primarily in a fuel cell system wherein the ratio of the specific gravity of the electrolyte (e.g., LiCl) to that of the electrode's associated reactant (e.g., Li) is greater than unity. By associated reactant, I mean that fuel or oxidizer, as appropriate, which is to be used solely with a particular electrode. The electrode of my invention comprises basically a liquid reservoir, an active element between the reservoir and the cell electrolyte, and a pumping means for removing liquid from the reservoir when appropriate, as hereinafter discussed. By active element, I mean a penetrable portion of the reversible electrode which is situate between and communicates the inside with the outside of the reservoir, and which serves as the electrochemical conversion situs, by virtue of its being the electron acceptor or donor during discharge or recharge, as appropriate.

During discharge the electrode continuously maintains a reactant-electrolyte electrochemical reaction interface at the electrode's active element. During recharge the active element of the electrode electrolytically disassociates the electrolyte and selectively extracts the electrode's associated reactant. The electrode stores in situ the thus extracted disassociation product which subsequently becomes available for reconsumption within the cell under discharge conditions.

As previously indicated the electrodes of my invention comprises a reservoir, an active element and a pumping means. One wall of the reservoir contains the penetrable active element which serves as the electrochemical conversion surface of the electrode. The aforementioned penetrable element permits the flow of liquid in either direction therethrough, depending upon the direction of the differential pressure existing across same. In its fully charged condition the aforementioned reservoir is substantially filled with reactant. In its fully discharged condition the reservoir is filled with a reactant displacing liquid. The cell's electrolyte is the preferred displacing liquid but isolated closed circuit of another liquid could also be employed to obtain the same results. A pump means is provided to remove liquid from the reservoir when required. When the electrode is completely immersed in a liquid, the reservoir filled, and the pumping means at rest, substantially no differential pressure exists across the penetrable element. With the activation of the pump and the attendant depletion of the liquid within the reservoir a pressure differential in the direction of the reservoir is established across the penetrable element, thereby causing fluid to flow through the element into the reservoir.

When fully discharged, the reservoir is filled with electrolyte. To charge, current is applied to the electrode's active element resulting in the electrolytic disassociation of the electrolyte into its components, one of which is the liquid reactant associated with the electrode. The pump is actuated to effect a pressure differential across the active element and liquid flows through the element into the reservoir. By balancing the rate of electrolytic disassociation with the rate of liquid depletion from the reservoir, the reactant formed by the electrolyte disassociation reaction is drawn into the reservoir at the same rate at which it is produced. The thus generated reactant fills the reservoir space previously occupied by the electrolyte which was pumped out. To prevent the passage of electrolyte through the penetrable element under conditions where the disassociation rate and the pumping rate are not perfectly balanced, a penetrable element is used which is wet more by the reactant sought to be recovered, than by the electrolyte. Hence, a ratio of the wetting characteristics of electrolyte to reactant of less than unity is preferred. In this situation the reactant to be recovered readily passes through the penetrable element as long as the differential pressure established is sufficient to overcome the buoyant forces acting on the reactant. The electrolyte which does not wet the penetrable element will not pass through until a certain additional minimum pressure differential is exceeded, i.e., sufficient to overcome the effects of surface tension between the electrolyte and the penetrable element. Passage of electrolyte through the penetrable element is not particularly detrimental to the operation. When it does happen, the electrolyte passes dropwise through the floating reactant and merges with the electrolyte pool at the bottom of the reservoir. As will be noted later, under discharge conditions there may be a need for the passage of electrolyte through the element.

When fully charged, the reservoir is substantially full of reactant. In the preferred embodiments the reactant floats atop a layer of electrolyte which remains at the bottom of the reservoir. In the preferred embodiments the uppermost surface of the reactant contacts the penetrable element, which is the active element of the electrode. However, the location of the penetrable element need not necessarily be restricted to the upper wall of the reservoir as will be discussed hereafter. An electrochemical reaction interface between the reactant and the electrolyte is thus established at the element. As the reactant material is buoyant, it tends to rise to the electrolyte surface. To preclude this, the surface tension at the interface must be sufficient to withstand the buoyancy forces. If the surface tension at the interface were insufficient, the reactant would flow through the element upwardly through the electrolyte and physically contact the counterelectrode.

When discharging, the reactant is consumed, thereby reducing the volume of liquid in the reservoir proportionately. In order to maintain the reactant in contact with the active surfaces of the electrode, it is necessary to replace the liquid in the reservoir at substantially the same rate as it is consumed. A means for readmitting electrolyte to the reservoir is required. Any of a variety of means for effecting this replacement is possible as long as during discharge it can keep the reservoir full. During discharge, the ratio of reactant to electrolyte decreases until there is no reactant material remaining.

Figure 2:
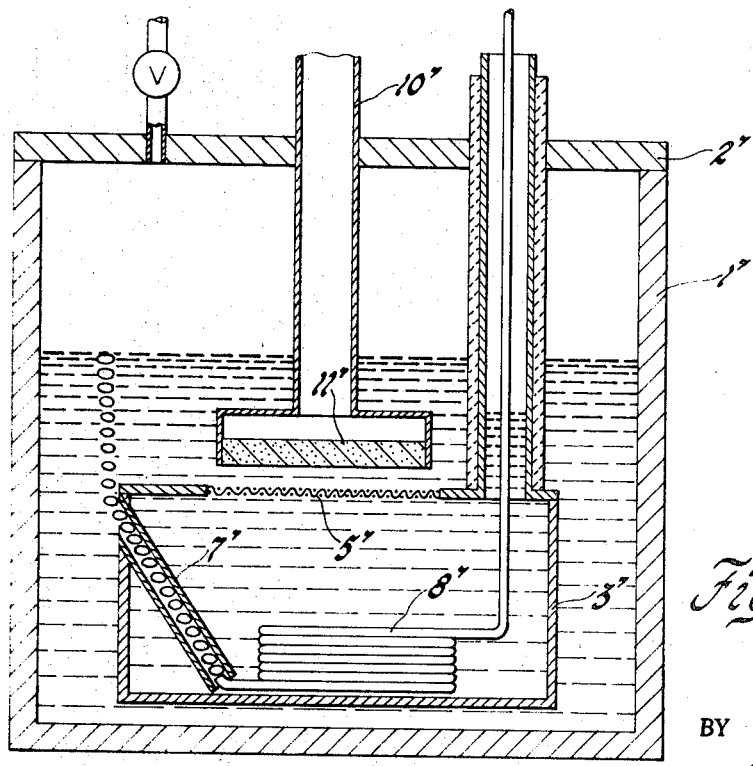
FIG. 2 is a cross sectional view of another device encompassed within the scope of my invention.

Some specific examples of electrodes encompassed within the scope of my invention but designed specifically for use in a $Li/LiCl/Cl_2$ system are shown in FIGS. 1, 2 and 3. In FIG. 1 a cell container 1 houses the essential components of a $Li/LiCl/Cl_2$ fuel cell. The cell container 1 may advantageously be constructed from stainless steel, nickel and/or any material which is not attacked by the chemical components of the system. In addition to nonreactivity with the chemical components of the system, other factors such as strength, weight, electrical and thermal conductivity, etc., should be considered when selecting which material is to be used in any given system. The cell container top 2 having appropriate sealing means (not shown) completes the cell closure. The top 2 can be constructed from the same materials as the container 1. An oxidant, herein $Cl_2$, electrode 11 is positioned opposite the fuel electrode E. Oxidizer feed tube 10 supplies the electrode 11. Feed tube 10 is constructed from an electrically conductive material which is immune to attack by the chemical components of the system. I prefer to use dense graphite. The oxidizer electrode 11 may be of any conventional gas type compatible with the environment. I prefer to use porous carbon in the $Li/LiCl/Cl_2$ system. However, in a lower temperature system any porous metal, such as nickel, might also be used.

The fuel electrode E has a reservoir 3 which holds reactant when fully charged and electrolyte when fully discharged. Other embodiments of this electrode are shown in FIGS. 2 and 3. Stem 4 provides an electrically conductive path to the outside of the cell, a means for replenishing or removing the reactant if necessary, and a conduit for an inert gas admission tube 8, to be discussed hereafter. Stem 4 is provided with a ceramic sheath 6 to electrically isolate the stem from the electrolyte. By so doing, lithium will not form on the stem during recharging. On the upper surface of the reservoir 3 is an electrically conductive penetrable element 5 which serves as the active surface of the electrode. The penetrable element 5 may comprise a metal screen, felt metal, woven wire, sintered metal, or any material which is inert to the chemical components of the system, is electrically conductive, and will permit passage of liquid in either direction.

A material which is wet more by the reactant to be recovered than by the electrolyte is preferred. For a $Li/LiCl/Cl_2$ system, I prefer to use a sandwich of two layers of type 316 perforated stainless steel separated by a layer of 50 x 50 mesh type 316 stainless steel screen having a wire diameter of 0.007 inch. This arrangement gives a thickness of about 0.032 inch with an effective hole size of 0.016 inch. Generally speaking, for best results, the hole diameter should not exceed the element thickness. The stainless steel is wet by molten lithium but not by molten lithium chloride. The lithium, therefore, readily passes through the screen under differential pressures which are insufficient to force the LiCl through. A pumping means is provided to remove liquid from the reservoir, as appropriate, to effect the pressure differential. I prefer an air-lift type pumping means. However, an inert gas, such as argon, is used to produce the pumping action instead of air. It is admitted into the reservoir through an admission tube 8. The tube 8 is open at its end 8a. The end 8a is placed immediately beneath or slightly extending into a lift tube 7. The lift tube 7 discharges above the electrolyte level. It may also discharge below the electrolyte level. However, the electrode operates differently depending on whether the upper end of tube 7 discharges above or below the electrolyte level. This will be discussed more fully in connection with FIG. 2. The lift tube 7 like the stem 4 has a ceramic sheath 9 thereabout to prevent the formation of lithium on the external surface of the tube during charging. When using an air-tight pump a maximum allowable pressure differential across the element 5 is established equal to the total head $h$ when the liquid level in tube 7 corresponds to the bottom of tube 7. The level of LiCl in the tube 7 may, of course, be higher and if so, the differential pressure across element 5 will be correspondingly lower. The head $h$ is comprised of two liquid heads, $h_1$ and $h_2$. $h_1$ is equal to the height of the electrolyte head above the element 5. $h_2$ is equal to the height of the liquid head between the element 5 and the input end of lift tube 7. It should be noted that the $h_2$ will vary during the course of charging because the respective heads of lithium and lithium chloride between the element 5 and the input of lift tube 7 are varying from a maximum equal to the density of lithium chloride times $h_2$ to a minium of the density of molten lithium times $h_2$. The gas admission tube 8 is advantageously coiled within the reservoir 3 as is indicated by 8b in order to heat the incoming gas.

When the cell is fully charged, the reservoir is substantially filled with floating reactant, i.e., molten lithium, to an amount equal to that of $h_2$. Electrolyte fills the balance of the reservoir. In this condition no inert gas is fed to the system and no electrolyte is pumped out of the reservoir. The lithium which is floating atop the electrolyte in the reservoir 3 is prevented from escaping through the element 5 because of the interfacial tension existing at the element, electrolyte, and reactant interface. The interfacial tension must be such as to prevent the heavier LiCl from passing through the element and displacing the lighter Li.

To discharge the cell an oxidant is admitted through feed tube 10. An external circuit is closed through the tube 10 and stem 4. The fuel in contact with the element 5 is electrochemically consumed in the formation of electrolyte, i.e., lithium chloride. In order to insure contact of the fuel with the element 5 at all times it is necessary to admit electrolyte to the reservoir 3 in order to compensate for that volume of floating fuel which is consumed. Any convenient way for doing this is acceptable so long as the electrolyte input means admits only that volume of electrolyte which is equal to the volume of the fuel consumed. A convenient way of effecting this result is to provide an electrolyte input means which has a pressure drop across it which is less than the pressure differential required to pass electrolyte through the bulk of element 5. A convenient way of providing this means is to have at least one discontinuity, i.e., relatively large pore or path (such as the pore 12), through element 5 which is less resistant to the flow of electrolyte than is the rest of element 5. When using a perforated sheet such as discussed heretofore a larger hole in the order of 0.063″ is satisfactory. The differential pressure required to effect flow of electrolyte through the larger pores is necessarily less than that required to effect the flow of electrolyte through the rest of element 5. As the reactant is electrochemically consumed at element 5 a reduction of the volume of the fluid in reservoir 3 results. A differential pressure across element 5 is created. When the differential pressure across element 5 increases beyond the point where electrolyte flow through the larger pores occurs, electrolyte enters the reservoir 3 dropwise, sinking through the lighter reactant and merging with the electrolyte pool at the bottom of the reservoir. Another convenient means for introducing electrolyte into the reservoir is a capillary tube extending from the electrolyte within the reservoir to a point external to the reservoir. The size and properties of the capillary tube may be determined using the same considerations required to determine the aforementioned larger pores of element 5. Whatever electrolyte admission means is employed, it must have a pressure differential across it which is less than $h$ else gas would undesirably back up into the reservoir. Hence, as discharge continues, reactant is consumed at the element 5, replacement electrolyte is admitted to the reservoir 3, and the reactant to electrolyte interface within the reservoir rises until all the reactant is consumed.

To recharge the cell a source of direct current is applied to the cell so as to effect the electrolytic decomposition of the electrolyte. Inert gas is concurrently piped through tube 8 and emerges therefrom via tube outlet 8a from whence it bubbles up through lift tube 7 carrying with it some of the electrolyte in the reservoir 3. The pumping action of the bubbling gas effects a pressure differential across the element 5. By electrolysis the reactant, i.e., lithium, plates onto the element 5. With a ratio of the wetting characteristics of electrolyte to reactant of less than unity, the element 5 is preferentially wet by the reactant. Due to the differential pressure existing across the element 5 and the respective wetting characteristics, the reactant is preferentially drawn through the element 5 to the exclusion of the electrolyte. This process continues until the fuel-electrolyte interface in the reservoir recedes to slightly above the input end of the lift tube 7. The inert gas and charging current is shut off and the cell is in condition for discharge.

FIG. 2 is a variation of the device described in FIG. 1.

The device of FIG. 2 differs from that of FIG. 1 solely in that the discharge end of the lift tube 7' terminates beneath the electrolyte level. By virtue of this difference, the cell operates differently upon discharge than does the device disclosed in FIG. 1. When at rest (i.e., no charge or discharge) and when discharging, inert gas must be continuously fed to the electrode. The continuous feeding of the gas and attendant percolation of same through lift tube 7 prevents the backflow of substantial quantities of electrolyte from outside the reservoir into the reservoir through lift tube 7'. Even during percolation, however, a certain amount of electrolyte does flow back through lift tube 7'. The inside wall of the tube is always wet with a film of electrolyte which flows countercurrent to the bulk of the flow in the tube. By inclining the tube as shown in FIG. 2, apparently more backflow can be obtained owing to the formation of a thicker descending film at the lower inner surface of the tube 7'. While at rest, the amount of electrolyte flowing downwardly through the tube equals the amount being pumped out of the reservoir. Hence, a condition of dynamic equilibrium exists. When discharging, the amount of electrolyte backflow through the lift tube 7' exceeds the amount being pumped out of lift tube 7' in an amount equal to the volume of reactant consumed. Under this embodiment there is no absolute need for another electrolyte readmission means, i.e., large pores in element 5' or capillary tubes. Though not required, it is advisable to provide these electrolyte admission means in order to insure the continuous supply of reactant to the element 5 in those cases where extreme demand is put upon the system.

FIGS. 3 and 3a are other embodiments of devices within the scope of my invention. FIGS. 3 and 3a differ primarily from FIGS. 1 and 2 in that the air-lift type pumping circuitry is located external to the cell housing or closure. In FIG. 3 the lift tube 27 having its discharge end 27b positioned above the electrolyte level is the external equivalent of lift tube 7 of FIG. 1. Likewise, in FIG. 3a the tube 27' having its discharge end 27b' beneath the electrolyte level is the external equivalent of lift tube 7' of FIG. 2. The lift tube arrangements shown as 27 and 27' are used alternatively. In FIG. 3 the upper portion of the cell container 21 houses the essential components of the system. The lower portion of cell container 21 acts in concert with an electrically conductive penetrable element 25 and the lift tube 27 to form the electrode of my invention. The cell container 21 may advantageously be constructed from stainless steel, nickel, and/or any material which is not attacked by the chemical components of the system. A top 22 having appropriate sealing means (not shown) completes the cell closure. Oxidizer feed tube 30 supplies the electrode 31. Feed tube 30 is constructed from an electrically conductive material which is immune to attack by the chemical components of the system. I prefer to use dense graphite. The electrode 31 and oxidizer feed tube 30 have a sheath 36 threabout. The sheath 36 serves to isolate the region above the electrode 31 from the container 21. Unreacted chlorine passes into this region. The region is vented through tube 34. The cell container 1 is thereby isolated from the attack of $Cl_2$. The chlorine sheath 36 is preferably constructed from beryllia, but other materials such as graphite, aluminum nitride, aluminum oxide, or other ceramics, might well be used. The container 21 is provided with a tube 35 to a positive pressure in that region bounded by the container 21 and the sheath 36. Under pressure the electrolyte level in this region is lowered to eliminate the unnecessary plating of reactant onto the container walls while charging. To charge, an inert gas (i.e., argon) is pumped through tube 28 into lift tube 27. With the introduction of the gas the air-lift type pumping action is commenced and a pressure differential established across the element 25. During discharge, valve 37 is closed to prevent the backflow of gas from the region between the container 21 and sheath 36 into the reservoir. A convenient valving means comprises a cooling coil or the like. Cooling the tubing at one point freezes a slug of material at that point, thereby impeding further flow. The use of a valve is primarily precautionary. When designed so that the pressure required to upset the Li-LiCl interface is less than the required to permit backflow of argon, the valve is not needed. In all other respects the device is operated the same as the device disclosed in FIG. 1.

The exact location and structure of the active element 5 may be varied to meet the requirements of a given system. Hence, in a system where the ratio of the specific gravity of the electrolyte to the specific gravity of the reactant to be regenerated is less than unity, the element 5 may advantageously be placed at the bottom of the reservoir and the electrolyte admission and removal means rearranged to respond to the changed environment. Obviously the counterelectrode would also have to be moved so as to be properly oriented opposite the element 5. Similarly, for either system, i.e., where $$\frac{\text{specific gravity of electrolyte}}{\text{specific gravity of reactant}} \text{ is} > 1 \text{ or} < 1$$

the element 5 may be located on the side of the reservoir. In this connection, however, the wettability of the element by the reactant must be such as to keep it coated with reactant regardless of the location of the reactant-electrolyte interface within the reservoir. Relatively flat cylindrical reservoirs in combination with small pore size in the element seem to be effective to keep side wall elements wet with reactant.

Therefore, though my invention has been described in terms of certain preferred embodiments, it is to be understood that others may be adapted and that the scope of my invention is not limited except by the appended claims.

I claim:
1. A rechargeable galvanic cell in which the specific gravity of the cell's electrolyte is greater than the specific gravity of a liquid reactant of said cell, said cell comprising an electrode immersed in a pool of said electrolyte and having a reservoir means for receiving and dispensing an electrolyte and said liquid reactant, an electrically conductive penetrable element in a wall of said reservoir communicating the inside of said reservoir with the outside of said reservoir, said element being a situs for the electrochemical reaction of said liquid reactant occurring at said electrode, an electrolyte outlet from said reservoir, an electrolyte pump to pump electrolyte out of said reservoir through said outlet and into said pool when recharging said cell to reduce the pressure inside said reservoir below the pressure outside said reservoir, an electrolyte inlet in said electrode to admit electrolyte from said pool into said reservoir when discharging said cell to buoy said reactant up in said reservoir and a counterelectrode adjacent said penetrable element of said electrode.

2. A cell as claimed in claim 1 wherein said electrolyte pump is an airlift-type pump comprising a lift tube having its inlet end inside said reservoir and its discharge end outside the reservoir, and means for providing gas to said inlet end of said lift tube.

3. A cell as claimed in claim 2 wherein said discharge end of said lift tube is above said pool.

4. A cell as claimed in claim 1 wherein said electrolyte inlet comprises an opening in said penetrable element, said opening having dimensions such that the ratio of the pressure drop across said opening required to pass electrolyte through said opening to the pressure drop required to pass electrolyte through the rest of said element is less than unity.

5. A cell as claimed in claim 2 wherein said electrolyte inlet is said lift tube.

6. In a galvanic cell comprising a molten metal reactant, a fused salt electrolyte and a counterreactant in which the ratio of the specific gravity of the electrolyte to the specific gravity of the molten metal is greater than unity, the improvement comprising an electrode comprising, a reservoir holding said electrolyte and molten metal, an electrically conductive penetrable element situate between and communicating the inside with the outside of said reservoir, an electrolyte outlet from said reservoir, and an air-lift type pump to pump electrolyte out of said reservoir through said outlet, said pump comprising a lift tube having its inlet end inside said reservoir and its discharge end outside said reservoir and means for providing gas to said inlet end of said lift tube, and an inlet in said electrode to admit electrolyte into said reservoir to buoy said molten metal up while discharging the cell.

7. A cell as claimed in claim 6 wherein said element is a perforated sheet, the discharge end of said lift tube is above the electrolyte level in said cell and said inlet is at least one opening in said sheet said opening having dimensions such that the ratio of the pressure drop across said opening required to pass electrolyte through said opening to the pressure drop required to pass electrolyte through the rest of said sheet is less than unity.

8. A cell as claimed in claim 6 wherein said element is a perforated sheet, the discharge end of said lift tube is below the electrolyte level in said cell and said electrolyte inlet is said lift tube.

9. A process for discharging a galvanic cell comprising the steps of providing a reservoir which is substantially full of a liquid cell reactant, providing an electrically conductive penetrable element in at least one wall of said reservoir to communicate the inside of said reservoir with the outside of said reservoir, said element being covered by said cell's electrolyte, closing an electrical circuit between said electrically conductive penetrable element and said cell's counterelectrode to electrochemically consume said reactant at said element and admitting a second liquid to said reservoir to buoy said liquid reactant up into contact with said element and to fill the space left by said reactant being consumed.

10. A process as claimed in claim 9 wherein said second liquid which is admitted to said reservoir to fill the space left by said reactant is electrolyte.

11. A process for electrolyzing a fused electrolyte in an electrochemical cell comprising the steps of providing an electrolyte containing reservoir beneath the surface of a pool of said electrolyte, which reservoir has an electrically conductive penetrable element in at least one wall of said reservoir contacting said electrolyte to communicate the inside of said reservoir with the outside of said reservoir and an electrolyte outlet from said reservoir, providing an electrolyte pump, applying a source of current to said electrically conductive penetrable element and a counterelectrode in said pool to electrolytically decompose said electrolyte into its constituent reactants, and pumping said electrolyte out of said reservoir through said outlet and into said pool to effect a differential pressure across said element in the direction of said reservoir and to provide space in said reservoir for the accumulation of one of said reactants in said reservoir whereby said one reactant passes through said element and is accumulated atop said electrolyte in said reservoir.

12. An electrochemical cell in which the specific gravity of the cell's electrolyte is greater than the specific gravity of a liquid reactant of said cell, said cell comprising an electrode immersed in a pool of said electrolyte and having a reservoir means for receiving and dispensing an electrolyte and said liquid reactant, an electrically conductive penetrable element in a wall of said reservoir communicating the inside of said reservoir with the outside of said reservoir, said element being a situs for the electrochemical reaction of said liquid reactant occurring at said electrode, an electrolyte outlet from said reservoir, an electrolyte pump to pump electrolyte out of said reservoir through said outlet and into said pool when applying electrolyzing current to said cell to reduce the pressure inside said reservoir below the pressure outside said reservoir, and a counterelectrode adjacent said penetrable element of said electrode.

References Cited

UNITED STATES PATENTS 3,208,883   9/1965   Crouthamel et al. ____ 136—86

FOREIGN PATENTS 400,787   6/1909   France _____ 138—86

ALLEN B. CURTIS, Primary Examiner

U.S. Cl. X.R.

136—120, 160, 159; 204—284, 242